United States Patent [19]

Olson

[11] 4,392,616
[45] Jul. 12, 1983

[54] SELF-PERFORATING DRIP IRRIGATION DEVICE

[76] Inventor: Donald O. Olson, 5885 Dartmouth St., Chula Vista, Calif. 92010

[21] Appl. No.: 251,157

[22] Filed: Apr. 6, 1981

[51] Int. Cl.³ .................. B05B 15/06; B05B 15/00
[52] U.S. Cl. ................................. 239/271; 239/542
[58] Field of Search ........................ 239/271–272, 239/542, 547

[56] References Cited

U.S. PATENT DOCUMENTS

| | | | |
|---|---|---|---|
| 3,885,743 | 5/1975 | Wake | 239/272 X |
| 3,998,391 | 12/1976 | Lemelshtrich | 239/542 |
| 4,084,749 | 4/1978 | Drori | 239/271 |
| 4,281,798 | 8/1981 | Lemelshtrich | 239/542 |

FOREIGN PATENT DOCUMENTS 2397788  3/1979  France .................. 239/272

Primary Examiner—John J. Love
Assistant Examiner—Paul A. Sobel
Attorney, Agent, or Firm—Owen, Wickersham & Erickson

[57] ABSTRACT

A drip irrigation emitter having a body with internal structure for reducing fluid pressure to provide a low pressure trickle output and an inlet member providing a passage for water to the internal structure and adapted to connect the emitter to a supply hose. The inlet member has a frusto-conical barb portion integral with a neck portion that extends between the large end of the barb portion and the emitter body. A cylindrical portion extending from the small end of the barb portion, which has at least one inlet opening, is usable as a mechanical punch to enable the emitter to be attached with one simple operation to a plastic irrigation hose or lateral without prepunching holes therein.

3 Claims, 15 Drawing Figures

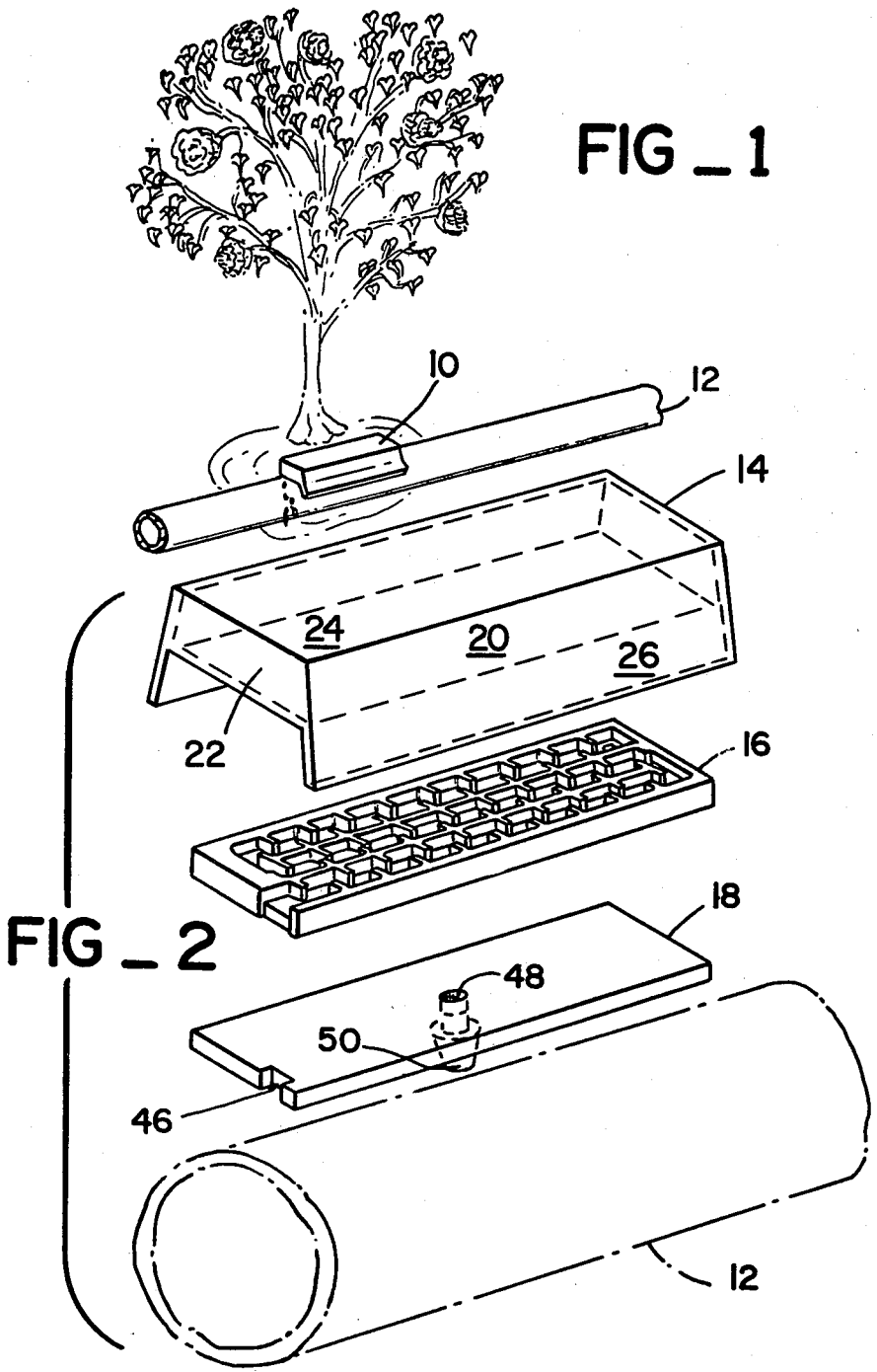

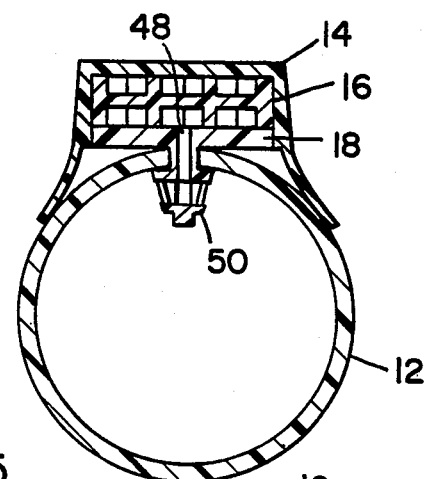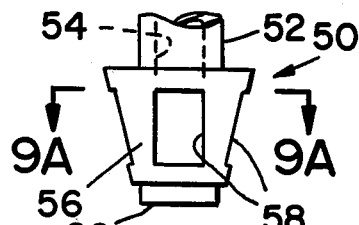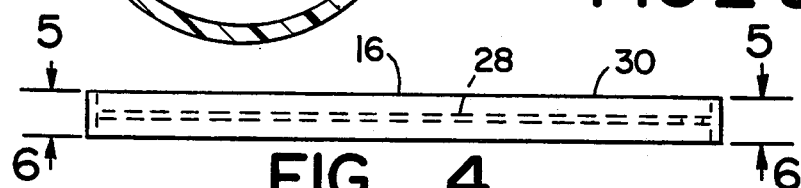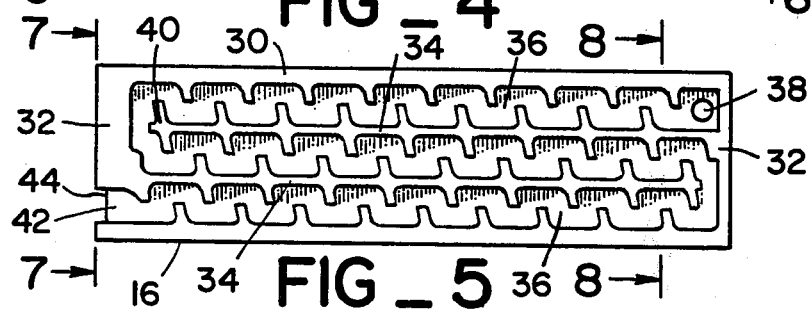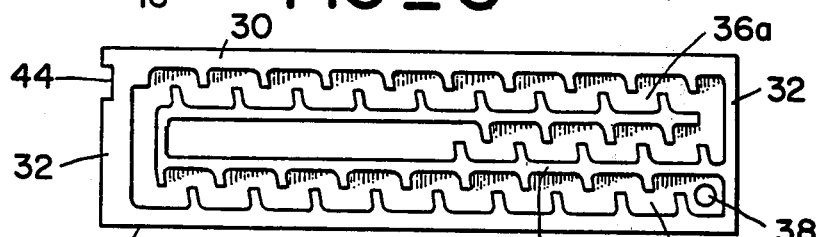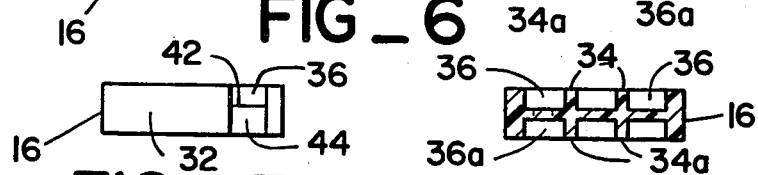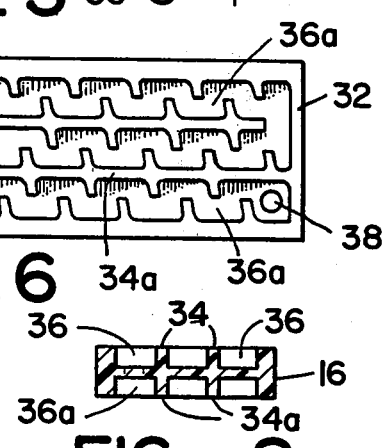

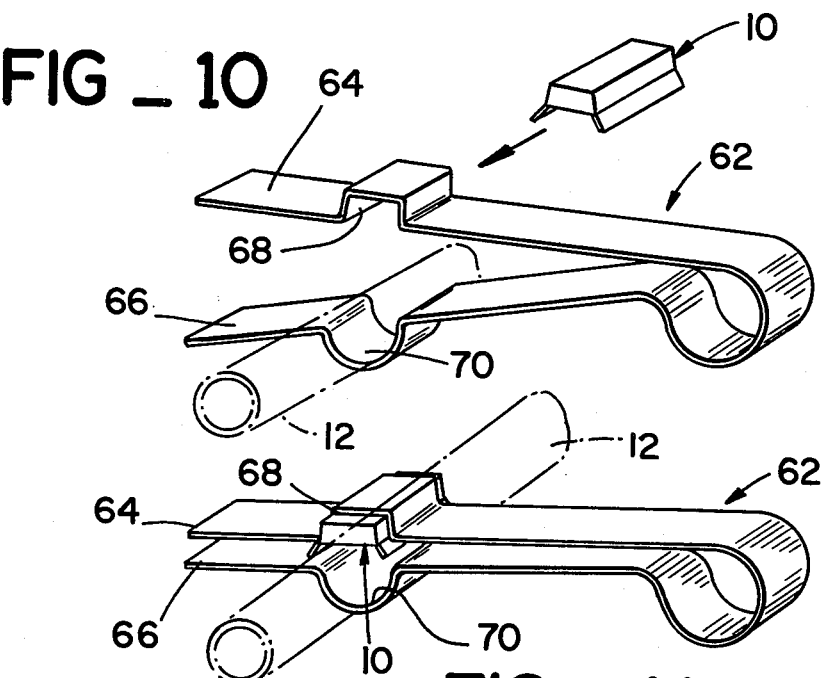
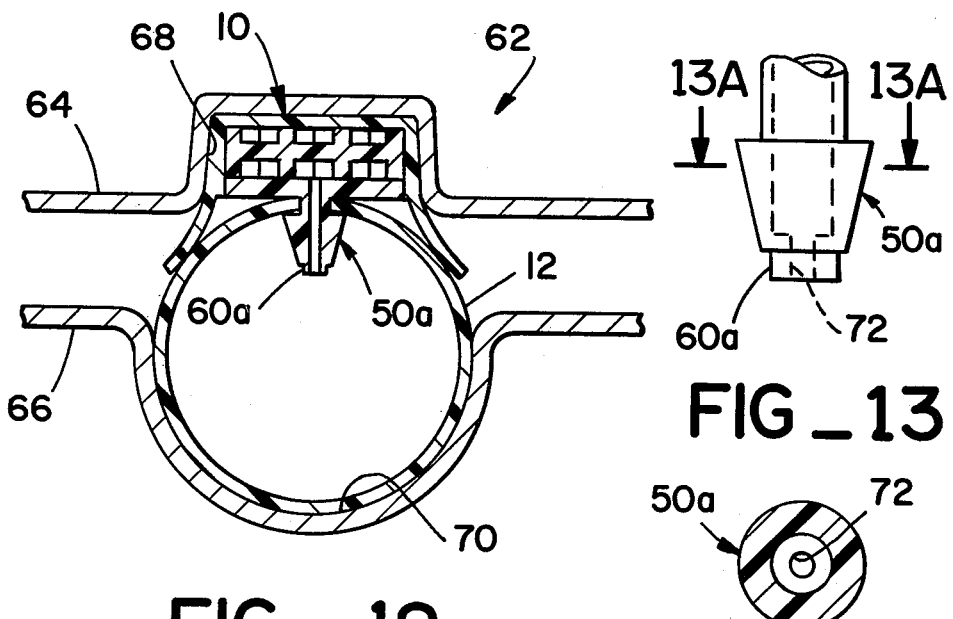

SELF-PERFORATING DRIP IRRIGATION DEVICE

This invention relates to emitter devices intended for use in drip irrigation systems, and more particularly, to an inlet member for such a device that enables it to be quickly attached to a hose or conduit of such a system.

BACKGROUND OF THE INVENTION

With the increasing use and development of drip irrigation systems, various forms of emitters have been devised for reducing the fluid pressure in a conduit to a low, trickle output rate. Two general types of such emitters may be described as (1) those which are connected "in-line" with the supply conduit; and (2) those which are attached to and extract fluid from the conduit. With emitters of the first category, it is necessary to cut the conduit and attach it to opposite ends of the emitter; a process that is generally carried out in a factory as part of the manufacturer's system assembly procedure. Such a system has many disadvantages including relatively high initial cost, the need to eliminate residual stresses after assembly and before installation in the field, and the time consuming and expensive process of emitter replacement in the field. The second category of emitter, which in various forms has been found to be preferable over the in-line type, has utilized a barb type, frusto-conical inlet member that extends from the emitter body. Heretofore, to install emitters with such inlet members, it was necessary to first provide a hole in the hose or conduit to which the emitter was to be attached and then force the emitter's inlet member into the conduit hole. Such a procedure was more often performed in the field and proved to be a tedious hand-type operation that involved: (1) determining the desired hole location; (2) creating the hole; and then (3) forcing the emitter inlet member through the preformed hole. Often, it was possible for an installer of a large number of emitters in a system to make an error by forming a hole in a hose or conduit and then forgetting to install an emitter, a mistake that often had costly results.

One object of the present invention is to provide an improved inlet member for a drip emitter that solves the aforesaid problems and enables the emitter to be connected to a conduit without preforming a hole therein to receive it.

Another object of the invention is to provide an improved inlet member for a drip emitter that will punch out its own opening in a plastic hose or conduit of a drip irrigation system and which, when fully installed, will assure adequate flow to the emitter through one or more openings.

Another object of the present invention is to provide a hand tool for installing a drip emitter with an improved inlet member on a plastic conduit that may or may not contain water under pressure.

Yet another object of my invention is to provide an emitter with an improved inlet member that is particularly well adapted for high volume production at low unit cost and which also greatly reduces the cost of installing the emitter on a conduit of a drip irrigation system.

BRIEF SUMMARY OF THE INVENTION

In accordance with the principles of the invention, an inlet member is formed as an integral portion of a drip emitter for a drip irrigation system. Although the general configuration of the emitter body may vary, the inlet member is uniquely constructed so that it can penetrate the wall of a drip irrigation conduit to form its own opening and become permanently connected thereto. This connection or installation procedure for the emitter can be performed quickly and easily with the aid of a simple tool, and it completely eliminates the prior procedure of preforming a hole in the conduit and then inserting the inlet member of an emitter. In broad terms, the inlet member comprises a tubular shank portion that extends from an inlet opening of the emitter. Spaced from the emitter inlet opening and integral with the shank portion is a frusto-conical barb portion whose larger end is closest to the emitter body. Integral with and extending from the smaller end of the barb portion is a cylindrical end portion having a transverse end surface that forms a relatively well defined circular edge. Openings through the barb portion and thus, its integral shank, are provided in either its conical side wall or through the cylindrical end portion. The circular edge of the cylindrical end portion is sharp enough to cut through the plastic material forming the wall of the irrigation conduit when the emitter with its inlet member is forcefully pressed against it as the conduit is held firm. A special hand tool will enable a person to provide the necessary positioning of an emitter relative to a conduit and adequate force to install the emitter inlet portion within the conduit. Thus, the present invention enables emitters to be installed in a plastic conduit with increased speed and efficiency.

Other objects, advantages and features of the invention will become apparent from the following detailed description, presented in conjunction with the accompanying drawing.

BRIEF DESCRIPTION OF THE DRAWING

FIG. 1 is a view in perspective of a drip emitter utilizing an inlet member according to the present invention as it appears when attached to a fluid conduit;

FIG. 2 is an enlarged exploded view in perspective of the emitter of FIG. 1;

FIG. 3 is a view in elevation and in section showing the emitter of FIG. 1 with its inlet member connected to a conduit;

FIG. 4 is a view in side elevation of the central flow controlling section for the emitter of FIGS. 1–3;

FIG. 5 is a top plan view of the flow controlling section of FIG. 4;

FIG. 6 is a bottom plan view of the flow controlling section of FIG. 4;

FIG. 7 is a view in section taken along line 7—7 of FIG. 5;

FIG. 8 is a view in section taken along line 8—8 of FIG. 5;

FIG. 9 is an enlarged fragmentary view in elevation showing the emitter inlet member according to the invention in greater detail;

FIG. 9a is a view in section taken at line 9a—9a of FIG. 9;

FIG. 10 is a view in perspective showing an installation tool for holding an emitter prior to connecting it to a conduit according to the invention;

FIG. 11 is a view in perspective showing the tool of FIG. 10 in use during the installation of an emitter in a conduit shown in phantom;

FIG. 12 is an enlarged view in elevation and in section showing the emitter fully installed in a conduit by a tool according to the invention;

FIG. 13 is a further enlarged view of another form of inlet member embodying principles of the invention; and FIG. 13a is a view in section taken at line 13a—13a of FIG. 13.

DETAILED DESCRIPTION OF EMBODIMENT

With reference to the drawing, FIG. 1 shows a drip emitter 10 utilizing an inlet member embodying the principles of the present invention as it appears when attached to a conduit 12, such as a section of plastic hose or tubing, in a drip irrigation system. In such a system, the conduit is normally supported on the ground surface and extends from a water supply source along the plants or trees to be irrigated. In general, the emitter 10, shown in greater detail in FIG. 2, comprises an outer housing 14, a central or internal body member 16 that fits within the housing, and a bottom cover member 18 to which is attached an inlet member 50 according to the present invention. These three main components are combined in a sandwich-like structure to provide an emitter that receives water through the inlet member under relatively high pressure from the conduit, causes turbulent flow within the central body member and emits a trickle of water at a relatively low pressure and a low constant flow rate.

For the emitter shown, the housing 14 has essentially an elongated, oblong shape and is molded from a suitable plastic such as polypropolene. Thus, it has integral side walls 20, end walls 22, and a top 24, that combine to form a space for the internal body member 16. Integral with the lower edges of the side walls 20 and extending downwardly therefrom, are winglike extensions 26 which provide the emitter with means for gripping the conduit when installed, as shown in FIG. 3.

The central body member 16 is generally rectangular with outer dimensions that enable it to fit snugly within the housing. As illustrated in FIGS. 3-8, it has a central planar portion 28 and integral side wall and end wall portions 30 and 32 extending from both top and bottom sides of the planar portion. Extending from each opposite end wall portion on the top side and parallel to the side walls are intermediate wall portions 34 of the same height as the side wall and end wall portions. As shown best in FIG. 5, both intermediate walls terminate at a short distance from the opposite end wall from which they extend so that a continuous, winding fluid passage 36, extending up and down the length of the central body member, is formed on its top side. A hole 38 is provided in one corner of the central planar portion of the body member 16 which enables water to flow from its bottom side to its top side. On the bottom side of the central body, an intermediate wall 34a, somewhat different in shape, is provided that extends from one end wall towards the opposite end wall and then turns back with a parallel, spaced apart portion, again forming a continuous passage 36a extending from near the center of the planar portion 28 to the hole 38.

As shown, each of the side walls and intermediate walls is provided with outwardly projecting baffle-like fins 40. These fins are integral with their respective wall members and are spaced apart evenly but at alternate locations from those fins on the closest adjacent wall member. The ends of the fins terminate along a line that is midway between and parallel to spaced apart side walls and intermediate walls. Also, these fins are essentially uniform in thickness with substantially parallel side walls, and they all extend from their wall member at a central body member 16. At one end, as shown in FIG. 2, it has a notch 46 that is aligned with the notch 44 of the central body member to provide the emitter outlet. Centrally located on the bottom cover member is a hole 48 aligned with the fluid passage of the barbed inlet fitting 50 that extends downwardly at a right angle to the plane of the bottom member.

As shown in FIGS. 3, 9 and 9a, the inlet fitting 50 in one preferred form has a cylindrical shank portion 52 that is integral with and extends downwardly from the bottom member 18. An inlet passage 54 formed by the shank portion is axially aligned with the hole 48 in the bottom member 18. Integral with the lower end of the shank portion is a frusto-conical portion 56 having a series of spaced apart side openings 58 in the conical surface that communicate with the inlet passage 54. Each of these openings 58 is essentially a long, narrow slot having an area that is approximately equal to the cross-sectional area for flow between adjacent spaced apart fins 40 within the emitter. The lower, smaller end of the frusto-conical portion 56 has an integral and axially extending solid end portion 60 that serves as a punch member to help the emitter penetrate a conduit and facilitate its installation thereon. In the form shown, this end portion is generally cylindrical although it could be somewhat tapered.

The aforesaid inlet fitting as described is important to achieve a relatively rapid and smooth installation of the emitter 20 on a plastic conduit 12 and also to its efficient and long-lasting operation once it has been installed. Generally, prior to installation of each emitter, the plastic conduit was pre-punched along its side wall to form an opening at each location where an emitter was to be installed. The opening was necessarily small relative to the shank of the inlet fitting so that a fairly tight and leak-proof attachment of the emitter could be made. After being pre-punched, it was thereafter necessary to locate the conduit opening and then force the inlet fitting through it. With the present invention, the prior, inefficient, two-step procedure is replaced by a single step installation procedure wherein the solid end portion 60 itself penetrates the conduit and forms its own punched hole for the frusto-conical portion 56. Once through the opening formed by the end portion 60, flow through the emitter is assured, since the possibility of the emitter flow being completely blocked at all of the side openings 58 by debris in the fluid stream is extremely remote.

In order for the inlet fitting of an emitter to punch itself through the wall of a plastic conduit effectively, the conduit must be restrained and the emitter must be moved toward it with proper force and speed. To provide these required conditions, a relatively simple tool 62 may be used, as shown in FIGS. 10-12. Such a tool may be made of a suitable strong but resilient material, such as a strip of spring steel. Essentially, it comprises a one-piece hand clamp having first and second arms 64 and 66 joined together by a curved end portion that normally retains the arms in an open position. The first arm has a rectangularly bent portion near its outer end that forms a seat 68 for holding an emitter having an oblong shape like emitter 10, so that its inlet fitting 50 is directed toward the other arm. The second arm has a semi-circular bent portion near its outer end forming a seat 70 for holding a conduit 12 to which the emitter is to be attached. Now, with an emitter and a conduit retained in their respective seats, when the two arms are brought together in a firm, continuous clamping action, the outer edges of the end portion 60 of the inlet member substantially cut through the plastic wall, forming a small circular opening for the frusto-conical barb portion 56. Thus, in one action, the emitter punches its own hole in the conduit and becomes attached thereto, being locked in place in back of the enlarged frusto-conical barb portion. As the installation takes place with the emitter 10, the flexible side extensions 26 are forced to spread apart but continue to grip the sides of the conduit while maintaining the emitter in axial alignment with it.

Although it is preferred to provide the inlet fitting 50 with a conical portion having side openings 58, it is possible to provide a single opening 72 through the lower end of the conical portion and thus, through the end portion 60a, as shown in FIGS. 13 and 13a. The presence of the opening through the end portion in no way affects the ability of the end portion to punch a hole in the plastic conduit in the manner already described.

From the foregoing, it should be apparent that the present invention constitutes an important advance in the field of drip irrigation by providing a self-punching inlet means for attaching an emitter to a conduit in a single operation without requiring any prior perforating or punching of the conduit to form an opening. Using emitters with the inlet fitting 50, an installer in the field can walk along a conduit and attach an emitter at the precise location desired, in a matter of seconds and also whether the conduit is empty or already filled with water under pressure. Also, of course, the emitters with an inlet fitting 50 could be attached to conduit at the factory before being delivered to the field.

To those skilled in the art to which this invention relates, many changes in construction and widely differing embodiments and applications of the invention will suggest themselves without departing from the spirit and scope of the invention. For example, along an oblong shaped emitter 10 as shown for illustrative purposes, the inlet fitting 50 or its equivalent could be used with other forms of emitters. The disclosures and the description herein are not intended to be in any sense limiting.

I claim:

1. In an emitter adapted for attachment to a conduit of yieldable, flexible material in a drip irrigation system, said emitter comprising a housing having inlet and outlet means and means within the housing forming a tortuous fluid path for reducing fluid pressure between said inlet and outlet means, said inlet means comprising:

an inlet fitting extending from said housing having a tubular shank portion with a central passage which connects with said tortuous fluid path;

a frusto-conical barb portion integral with said shank portion and spaced below an outer surface of said emitter housing from which said shank portion extends, said barb portion having an upper end with a diameter greater than said shank portion, at least one opening in said barb portion forming a passage through said inlet fitting to said central passage of said shank portion; and a rigid cylindrical end portion extending from the smaller, lower end of said barb portion having a substantially flat end face forming a well defined peripheral edge, the length of said cylindrical end portion and its said peripheral edge serving to sever the wall of a said conduit to remove a portion of conduit material and thereby form a circular opening therein when the emitter with said inlet fitting is attached to the conduit by being pressed against it.

2. The emitter as described in claim 1 wherein said rigid end portion is a solid, cylindrical member and said barb portion has a plurality of openings in its conical side wall.

3. The emitter as described in claim 1 wherein said rigid end portion has a cylindrical shape and said opening in said barb portion extends through the lower end of said barb portion and through said rigid end portion.

* * * * *